US012264995B2

(12) United States Patent
Klentzman

(10) Patent No.: US 12,264,995 B2
(45) Date of Patent: Apr. 1, 2025

(54) LEAK MONITORING MANIFOLD FOR A PUMPING SYSTEM

(71) Applicant: Welker, Inc., Sugar Land, TX (US)

(72) Inventor: James T. Klentzman, Wharton, TX (US)

(73) Assignee: WELKER, INC., Sugar Land, TX (US)

( * ) Notice: Subject to any disclaimer, the term of this patent is extended or adjusted under 35 U.S.C. 154(b) by 247 days.

(21) Appl. No.: 18/049,457

(22) Filed: Oct. 25, 2022

(65) Prior Publication Data

US 2023/0131733 A1  Apr. 27, 2023

Related U.S. Application Data

(60) Provisional application No. 63/263,107, filed on Oct. 27, 2021.

(51) Int. Cl.
*G01M 3/28* (2006.01)
*G01N 1/14* (2006.01)
*G01N 1/24* (2006.01)

(52) U.S. Cl.
CPC ............ *G01M 3/2815* (2013.01); *G01N 1/14* (2013.01); *G01N 1/24* (2013.01); *G01N 2001/1418* (2013.01)

(58) Field of Classification Search
CPC . G01L 19/147; G01L 9/0072; G01L 19/0645; G01L 19/0084; G01L 9/0042; G01L 19/0007; G01L 9/0073; G01L 13/025; G01L 19/0038; G01L 9/0075; G01L 9/0054; G01L 9/0055; G01L 19/04; G01L 19/148; G01L 7/00; G01L 7/04; G01L 19/14; G01L 19/0092; G01L 19/143; G01L 15/00; G01L 17/00; G01L 7/18; G01L 9/0051; G01L 9/065; G01L 9/12; G01L 9/0052; G01L 7/041; G01L 9/125; G01L 19/0618; G01L 19/0609; G01L 19/003; G01L 19/0627; G01L 19/0046; G01L 7/16; G01L 19/0636; G01L 9/06;
(Continued)

(56) References Cited

U.S. PATENT DOCUMENTS 4,403,519 A    9/1983  Welker
5,590,684 A *  1/1997  Alberts ............... F15B 13/0871
                                                      137/637.1
(Continued)

FOREIGN PATENT DOCUMENTS

CN    104074511 B  *  6/2018
CN    118408152 A  *  7/2024
(Continued)

*Primary Examiner* — Andre J Allen
(74) *Attorney, Agent, or Firm* — Husch Blackwell LLP

(57) ABSTRACT

A leak monitoring manifold is provided to detect and regulate sample leaks in a pump system. The manifold may include a fluid inflow location and a relief valve including a relief outlet which is in fluid communication with the fluid inflow location. The relief valve may operate to be in either of a first state or a second state. In the first state fluid flow out of the relief outlet is blocked, and in the second state fluid flow is open between the fluid inflow location and the relief outlet. The relief valve may alternate between the first state and the second state when a pressure acting on the relief valve reaches a preconfigured pressure set point.

19 Claims, 3 Drawing Sheets

(58) Field of Classification Search
CPC ..... G01L 19/0023; G01L 7/084; G01L 9/007;
G01L 9/0022; G01L 13/02; G01L 19/142;
G01L 19/02; G01L 9/008; G01L 7/043;
G01L 19/08; G01L 19/141; G01L 9/0002;
G01L 19/0672; G01L 23/18; G01L
19/0681; G01L 9/006; G01L 11/02; G01L
19/0069; G01L 9/0077; G01L 7/082;
G01L 19/12; G01L 27/005; G01L 23/10;
G01L 9/0044; G01L 19/0015; G01L
21/12; G01L 7/063; G01L 19/146; G01L
27/002; G01L 27/007; G01L 9/0001;
G01L 19/0654; G01L 13/026; G01L
9/0026; G01L 11/025; G01L 9/0047;
G01L 9/045; G01L 11/00; G01L 9/0089;
G01L 9/14; G01L 9/0025; G01L 11/008;
G01L 13/00; G01L 19/00; G01L 9/16;
G01L 19/0061; G01L 7/08; G01L 9/0041;
G01L 7/22; G01L 9/0019; G01L 19/069;
G01L 19/086; G01L 9/0076; G01L 9/08;
G01L 21/00; G01L 9/0005; G01L 19/083;
G01L 9/0035; G01L 1/18; G01L 9/10;
G01L 9/0008; G01L 9/0016; G01L 9/04;
G01L 11/006; G01L 19/06; G01L 1/2281;
G01L 19/10; G01L 19/16; G01L 9/0048;
G01L 9/0079; G01L 11/004; G01L
9/0027; G01L 9/00; G01L 9/0057; G01L
13/023; G01L 19/0663; G01L 7/048;
G01L 9/0086; G01L 11/04; G01L 23/24;
G01L 7/166; G01L 9/0091; G01L 1/02;
G01L 19/145; G01L 1/20; G01L 11/002;
G01L 27/00; G01L 7/182; G01L 9/036;
G01L 9/0039; G01L 9/0045; G01L
23/125; G01L 23/22; G01L 9/0061; G01L
9/0013; G01L 1/142; G01L 9/0092; G01L
1/2293; G01L 9/0033; G01L 9/0098;
G01L 9/02; G01L 1/205; G01L 21/04;
G01L 21/22; G01L 7/104; G01L 9/0007;
G01L 9/0064; G01L 9/0083; G01L 7/24;
G01L 9/0029; G01L 13/06; G01L 23/08;
G01L 23/16; G01L 7/022; G01L 1/148;
G01L 7/088; G01L 5/14; G01L 7/163;
G01L 1/16; G01L 23/222; G01L 9/0085;
G01L 9/025; G01L 21/14; G01L 1/2212;
G01L 1/2287; G01L 9/0004; G01L 9/085;
G01L 1/14; G01L 23/02; G01L 7/061;
G01L 9/003; G01L 19/0076; G01L 9/002;
G01L 9/0058; G01L 13/028; G01L 23/28;
G01L 7/02; G01L 9/0095; G01L 1/162;
G01L 1/2231; G01L 9/1246; G01L 19/149;
G01L 21/10; G01L 9/105; G01L 5/228;
G01L 7/086; G01L 9/0038; G01L 7/024;
G01L 7/12; G01L 9/0032; G01L 7/06;
G01L 1/005; G01L 1/2206; G01L 1/2262;
G01L 1/24; G01L 9/0082; G01L 1/146;
G01L 1/26; G01L 11/06; G01L 13/021;
G01L 19/144; G01L 7/187; G01L 23/26;
G01L 27/02; G01L 1/125; G01L 1/144;
G01L 23/00; G01L 9/0094; G01L 1/165;
G01L 1/2268; G01L 21/34; G01L 23/221;
G01L 7/068; G01L 7/102; G01L 7/20;
G01L 9/0097; G01L 1/225; G01L 13/04;
G01L 23/12; G01L 23/32; G01L 7/045;
G01L 7/14; G01L 1/086; G01L 1/241;
G01L 21/30; G01L 9/18; G01L 1/127;
G01L 1/22; G01L 1/245; G01L 17/005;
G01L 21/32; G01L 23/145; G01L 5/18;
G01L 7/108; G01L 9/001; G01L 1/183;
G01L 1/2218; G01L 5/0047; G01L
5/0076; G01L 9/0023; G01L 1/044; G01L
1/10; G01L 1/106; G01L 5/165; G01L
5/226; G01L 9/0017; G01L 9/005; G01L
9/0088; G01L 1/186; G01L 1/243; G01L
23/223; G01L 25/00; G01L 3/245; G01L
5/0038; G01L 5/0052; G01L 5/225; G01L
7/065; G01L 1/00; G01L 1/04; G01L
1/08; G01L 21/16; G01L 21/24; G01L
3/10; G01L 3/1485; G01L 5/0004; G01L
5/162; G01L 9/0014; G01L 1/103; G01L
1/2275; G01L 21/02; G01L 21/26; G01L
23/225; G01L 3/102; G01L 3/105; G01L
5/0028; G01L 5/0033; G01L 5/223; G01L
5/24; G01L 7/026; G01L 7/028; G01L
7/10; G01L 9/0011; G01L 1/083; G01L
1/12; G01L 1/242; G01L 1/247; G01L
1/255; G01L 2009/0069; G01L 21/08;
G01L 21/36; G01L 23/04; G01L 23/14;
G01L 3/103; G01L 5/00; G01L 5/102;
G01L 5/133; G01L 5/1627; G01L 5/166;
G01L 5/22; G01L 5/243; G01L 7/185;
G01L 1/042; G01L 1/046; G01L 1/122;
G01L 1/2225; G01L 1/2243; G01L
1/2256; G01L 1/248; G01L 2009/0066;
G01L 2009/0067; G01L 2019/0053;
G01L 21/06; G01L 23/06; G01L 23/085;
G01L 23/30; G01L 3/00; G01L 3/06;
G01L 3/1478; G01L 3/1492; G01L 3/18;
G01L 3/24; G01L 3/242; G01L 5/0057;
G01L 5/0061; G01L 5/08; G01L 5/10;
G01L 5/101; G01L 5/108; G01L 5/167;
G01L 5/171; G01L 5/28
USPC .................................................. 73/700–756
See application file for complete search history.

(56) References Cited

U.S. PATENT DOCUMENTS

| | | | |
|---|---|---|---|
| D1,003,771 S * | 11/2023 | Wilson | D12/118 |
| 2016/0332620 A1* | 11/2016 | Dudar | F02M 35/10222 |
| 2019/0107214 A1* | 4/2019 | Kruppe | F16K 31/508 |
| 2021/0223801 A1* | 7/2021 | Lawson | G05D 16/202 |

FOREIGN PATENT DOCUMENTS

| | | | | |
|---|---|---|---|---|
| JP | 2001023665 A | * | 1/2001 | |
| JP | 2002139401 A | * | 5/2002 | |

* cited by examiner

LEAK MONITORING MANIFOLD FOR A PUMPING SYSTEM

CROSS-REFERENCE TO RELATED APPLICATIONS

The present application claims priority to U.S. Provisional Patent Application Ser. No. 63/263,107, filed Oct. 27, 2021, the entire contents of which are incorporated herein by reference.

FIELD OF INVENTION

The invention relates to pump systems including sample pumps. In particular, the invention relates to a leak monitoring manifold for a pumping system.

BACKGROUND OF THE INVENTION

Pumping systems and sample pumps are used in applications involving hydrocarbons and other environmentally hazardous materials including hazardous liquids and gases. Typically, such pumps and sample pumping systems include various sealing mechanisms that prevent the release of these environmentally hazardous materials into the ambient environment. However, over time these sealing mechanisms can degrade due to normal operation of the pumping systems. This can lead to release of the environmentally hazardous materials into the ambient environment via various vents or apertures. At present, failure of the sealing mechanisms leading to leaks of the environmentally hazardous materials are only detected through use of electronic monitors placed in the ambient environment, which by their nature are reactive rather than proactive and are not able to prevent the environmentally hazardous materials from being released.

In light of these defects, a device capable of detecting leaks of the environmentally hazardous materials and directing the environmentally hazardous materials to a location other than the ambient environment is needed.

SUMMARY OF THE INVENTION

Embodiments described herein include a leak monitoring manifold having a fluid inflow location to be placed on a pump's vent port between its motor housing and lower product injection piston/cylinder, and a relief valve (or any vent port in communication with a sealing area prone to failure). It also may include a relief outlet in fluid communication with the fluid inflow location. The relief valve can be configured to operate in one of: a first state where fluid flow out of the relief outlet is blocked, and a second state where fluid flow is open between the fluid inflow location and the relief outlet. Furthermore, the relief valve can be configured to actuate from the first state to the second state when a pressure acting on the relief valve reaches a preconfigured pressure set point. In some embodiments, the leak monitoring detector can include a pressure indicator in fluid communication with the fluid inflow location and the relief valve. In such embodiments, the pressure indicator can be configured to provide an indication that the pressure acting on the relief valve is increasing. In some embodiments, the pressure indicator can include a pressure gauge and in other embodiments a pressure sensing indicator can send an alarm or signal to a remote monitoring device or location.

The foregoing and other features of the present invention will be apparent from the detailed description that follows.

BRIEF DESCRIPTION OF THE DRAWINGS

For a better understanding of the various embodiments of the present invention, reference may be made to the accompanying drawings in which.

Figure 1:
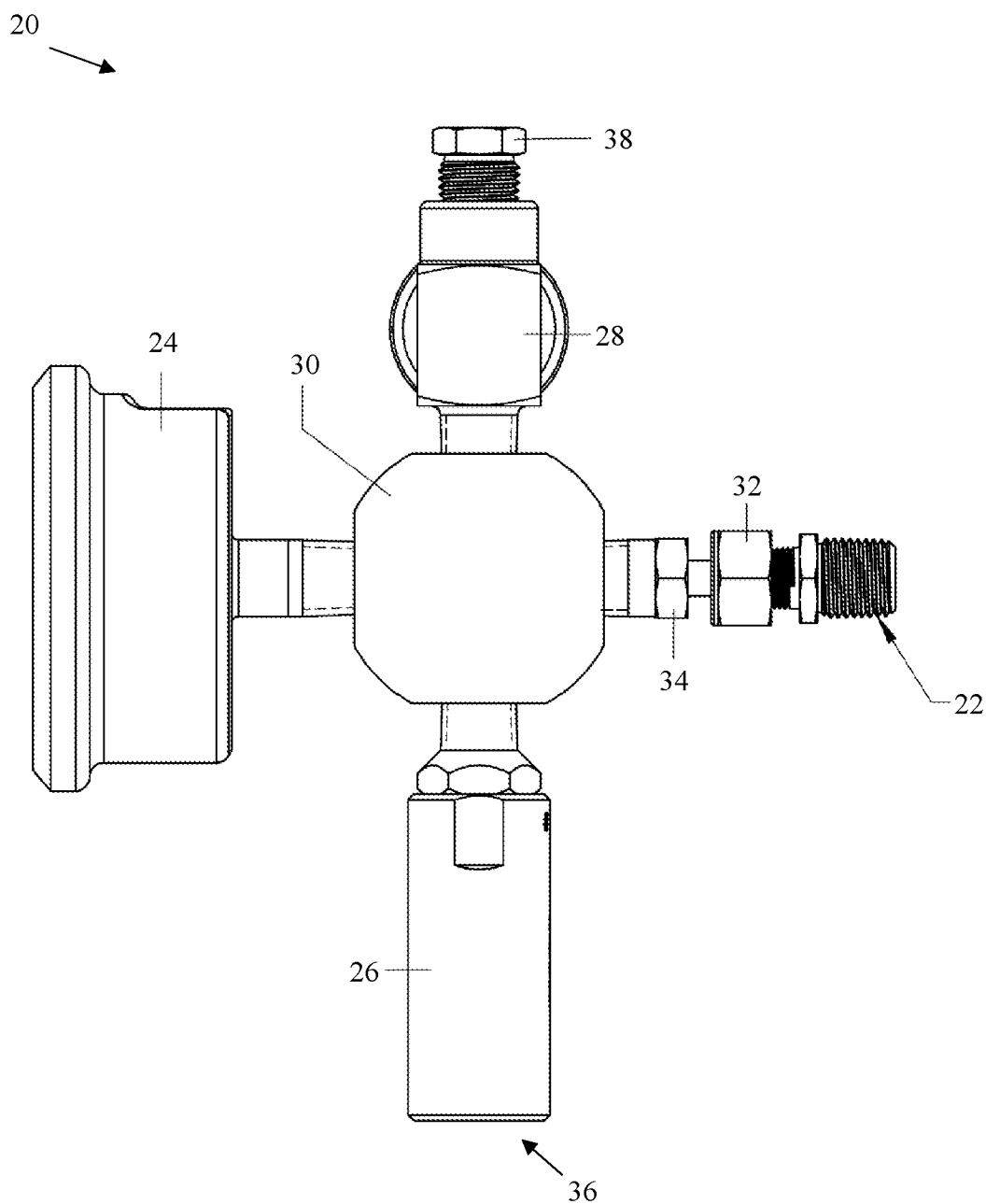
FIG. 1 is side elevation view of a leak monitoring manifold according to disclosed embodiments.

While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE DRAWINGS

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

FIG. 1 illustrates a leak detecting manifold 20 constructed according to disclosed embodiments. In some embodiments, the leak detecting manifold 20 can include a vent port connector 22 (which may be connected to a vent port of a pump that is directed to ambient), a pressure gauge 24, a relief valve 26, and a sample valve 28. Each of the vent port connector 22, the pressure gauge 24, the relief valve 26, and the sample valve 28 are preferably coupled together in fluid communication by a central structure 30. The central structure 30 may include a cross block to help regulate flow therethrough. Furthermore, in some embodiments, the vent port connector 22 can include a male connector 32 and a tube adapter 34 for coupling the vent port connector 22 to the central structure 30. The relief valve 26 and a relief outlet 36 thereof may include a female non-return valve (FNPT), and the sample valve 28 may include an actuated ball valve or an FNPT with a plugged outlet 38.

The relief outlet 36 may preferably expel environmentally hazardous materials from the leak detecting manifold 20. The relief valve 26 may be configured to operate in either a first state where fluid flow out of the relief outlet 36 is blocked or a second state where fluid flow is open between the vent port connector 22 and the relief outlet 36. In these embodiments, the relief valve 26 can be configured to actuate from the first state to the second state when a pressure acting on the relief valve reaches a preconfigured pressure set point.

Figure 2:
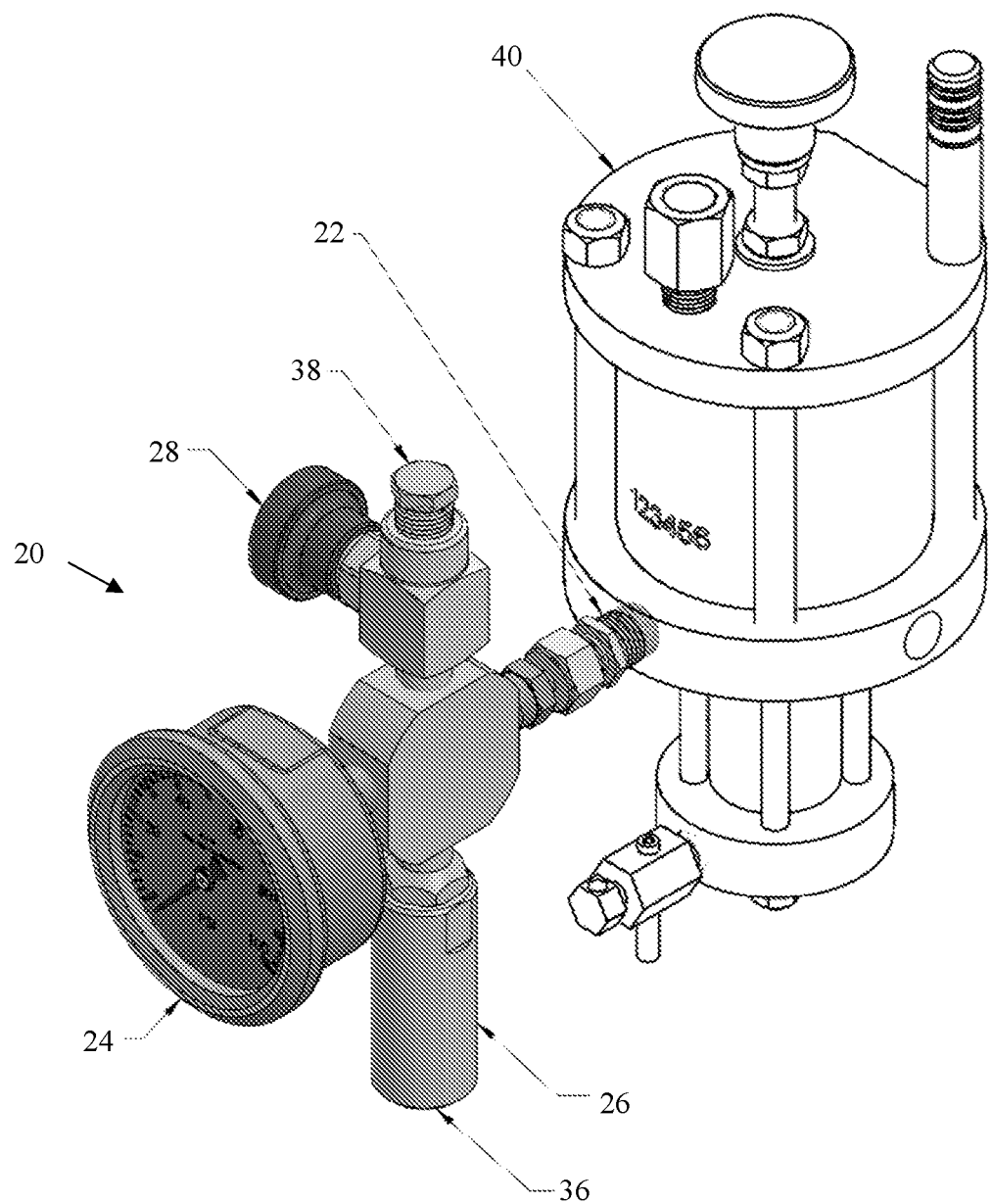
FIG. 2 is a perspective view of the leak monitoring manifold of FIG. 1.

Turning to FIG. 2, in some embodiments, the leak detecting manifold 20 may be configured to interface with a sample pump 40 to detect and capture any leaks of environmentally hazardous liquids or gases from the sample pump 40. Such leaks may result from a failing or degraded sealing mechanism of the sample pump 40. In some embodiments, the vent port connector 22 can interface with or couple the leak detecting manifold 20 to the sample pump 40 via a vent port (not illustrated) in the sample pump 40. For example, in some embodiments, the vent port connector 22 can serve as a fluid inlet or inflow location for the leak detecting manifold 20.

In operation, when the pump 40 begins to leak the environmentally hazardous liquids or gases, the pressure gauge 24 can detect the release by showing a pressure increase until the pressure detected by the pressure gauge 24 reaches the preconfigured pressure set point associated with the relief valve 26. Once the preconfigured pressure set point has been reached, the relief valve 26 can actuate to allow any excess pressure to flow from above the set point and release from the relief outlet 36. In some embodiments, the relief outlet 36 can be coupled to a recovery system or a flare to enable safe disposal of the environmentally hazardous liquids or gases. In some embodiments, the preconfigured pressure set point can be approximately 80 PSI, though the set point may vary, as could be known or foreseeable in the art.

In some embodiments, having the leak detecting manifold 20 release out of the relief outlet 36 can prevent fluid from entering a power piston assembly (not illustrated) of the sample pump 40 so as to prevent or limit the release of the hydrocarbons into the atmosphere through an exhaust of solenoids that drive the sample pump 40 with instrumentation air. Furthermore, in some embodiments, the pressure increase shown on the pressure gauge 24 prior to the actuation of the relief valve 26 can serve as a notification that the sealing mechanism in the sample pump 40 should be replaced so there will be no release of hydrocarbons. Therefore, the leak detecting manifold 20 as described herein may provide a way to monitor and complete preventative maintenance on the sample pump 40 before any release of the environmentally hazardous liquids or gases occurs. This can also be accomplished with an electronic pressure sensing detector to send an alarm or warning to a remote location. The pressure sensing detector may be a pressure transducer or a sensor connected to determine the pressure internal to the common block connector by an additional fitting (e.g., a street tee) on the relief or gauge.

Figure 3:
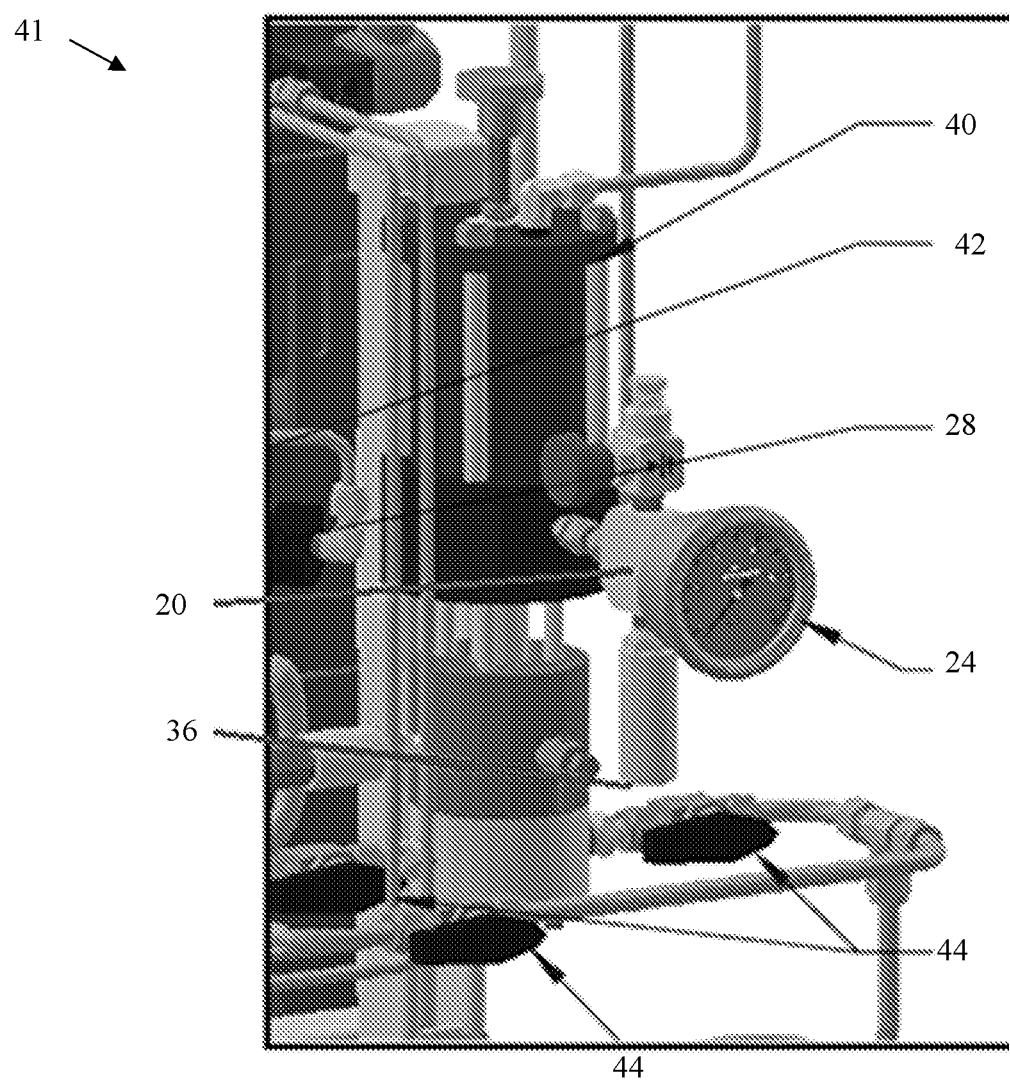
FIG. 3 is a pumping system including the leak monitoring manifold of FIGS. 1 and 2.

FIG. 3 illustrates the leak monitoring manifold 20 coupled to the sample pump 40 and integrated into a larger pumping system 41 according to disclosed embodiments. In some embodiments, the pumping system 41 can include locations 42 where pressure accumulates in the pumping system 41 and a plurality of isolation valve 44 configured to shut off fluid flow to the sample pump 40 to allow, for example, the sealing mechanism to be repaired or replaced and/or the leak detecting manifold 20 to be installed.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A leak monitoring manifold comprising:
    a fluid inflow location;
    a relief valve in fluid communication with the fluid inflow location and including a relief outlet,
    wherein the relief valve is configured to operate in one of a first state where fluid flow out of the relief valve is blocked and a second state where fluid flow between the fluid inflow location and the relief outlet is open,
    wherein the relief valve is configured to actuate from the first state to the second state when a pressure acting on the relief valve reaches a preconfigured pressure set point, and
    wherein the fluid inflow location comprises a vent port connector configured to be coupled to a vent port of a pump.

2. The leak monitoring manifold of claim 1 further comprising a pressure indicator in fluid communication with the fluid inflow location and the relief valve, wherein the pressure indicator is configured to provide an indication that the pressure acting on the relief valve is increasing.

3. The leak monitoring manifold of claim 2 wherein the pressure indicator comprises at least one of a pressure gauge and an electric sensor for sending a signal relating to a pressure increase to a remote location.

4. The leak monitoring manifold of claim 1, further comprising a sample valve in fluid communication with the fluid inflow location.

5. The leak monitoring manifold of claim 4, wherein the sample valve comprises a female non-return valve or an actuated ball valve.

6. The leak monitoring manifold of claim 2, wherein the pressure indicator and the relief valve are coupled to one another via a cross block.

7. The leak monitoring manifold of claim 1, wherein the relief valve comprises a relief outlet.

8. The leak monitoring manifold of claim 1, wherein the vent port connector is coupled to a central structure.

9. A leak monitoring system comprising:
    a sample pump including a vent port; and
    a leak monitoring manifold having a fluid inflow location coupled to and in fluid communication with the vent port,
    wherein the leak monitoring manifold includes a relief valve including a relief outlet in fluid communication with the fluid inflow location, and
    wherein the relief valve is configured to operate in one of a first state where fluid flow out of the relief outlet is blocked and a second state where fluid flow between the fluid inflow location and the relief outlet is open, and
    wherein, the relief valve is configured to actuate from the first state to the second state when a pressure acting on the relief valve reaches a preconfigured pressure set point.

10. The system of claim 9 wherein the leak monitoring manifold includes a pressure indicator in fluid communication with the fluid inflow location and the relief valve, and wherein the pressure indicator is configured to provide an indication that the pressure acting on the relief valve is increasing.

11. The system of claim 10 wherein the pressure indicator includes a pressure gauge.

12. The system of claim 9 wherein the leak detecting manifold includes an electric sensor for sending a signal relating to a pressure increase to a remote location.

13. The system of claim 9, wherein the relief valve is coupled to a recovery system.

14. The system of claim 9, wherein the pressure set point is about 80 PSI.

15. The leak monitoring manifold of claim 9, further comprising a sample valve in fluid communication with the fluid inflow location.

16. The leak monitoring manifold of claim 15, wherein the sample valve comprises a female non-return valve or an actuated ball valve.

17. The leak monitoring manifold of claim 10, wherein the pressure indicator and the relief valve are coupled to one another via a cross block.

18. The leak monitoring manifold of claim 9, wherein the fluid inflow location comprises a vent port connector configured to be coupled to a vent port of a pump.

19. The leak monitoring manifold of claim 18, wherein the vent port connector is coupled to a central structure.

* * * * *